United States Patent [19]

Brazier

[11] 3,859,574
[45] Jan. 7, 1975

[54] ELECTROLYTIC CAPACITOR WITH IMPROVED HEADER AND METHOD OF MAKING SAME

[75] Inventor: Robert L. Brazier, Pickens, S.C.

[73] Assignee: Sangamo Electric Company, Springfield, Ill.

[22] Filed: Oct. 19, 1973

[21] Appl. No.: 407,800

[52] U.S. Cl. ............... 317/230, 29/570, 174/52 S, 174/151
[51] Int. Cl...... H01g 9/10, H01g 13/00, H05k 5/06
[58] Field of Search............ 174/17.05, 50.5, 50.56, 174/52 S, 65 SS, 151, 152 R, 153 R; 29/25.41, 25.42, 570; 317/230, 260; 339/94 R, 94 A, 94 M, 147 C, 214 C, 218 C, 220 C

[56] References Cited
UNITED STATES PATENTS

| | | | |
|---|---|---|---|
| 2,111,419 | 3/1938 | Crotty | 174/65 SS UX |
| 2,199,519 | 5/1940 | Collins et al. | 317/230 X |
| 2,451,516 | 10/1948 | Skobel | 174/151 |
| 2,586,892 | 2/1952 | Weber et al. | 174/152 R X |
| 2,768,231 | 10/1956 | Schwennesen et al. | 174/151 X |
| 3,040,120 | 6/1962 | Berry | 174/151 X |
| 3,114,085 | 12/1963 | Ruscetta et al. | 317/230 |
| 3,555,370 | 1/1971 | Bowling | 317/230 |

FOREIGN PATENTS OR APPLICATIONS

| | | | |
|---|---|---|---|
| 718,515 | 11/1931 | France | 174/152 R |

*Primary Examiner*—Laramie E. Askin
*Attorney, Agent, or Firm*—Johnson, Dienner, Emrich & Wagner

[57] ABSTRACT

A capacitor header and method of constructing and assembling same so as to close off an open end section of an electrolytic capacitor casing. The header has two generally flat discs in spaced relationship, wherein each of the discs has at least one apertured protrusion that defines a swaged lead hole therethrough, the swaged lead holes being axially aligned and adapted to receive respective ends of an elastomeric member. The assembly including the two discs and the elastomeric member is inserted within an end section formed by the casing and the elastomeric member is placed in a compressed and distended condition by a rolling operation performed on the end section of the casing.

13 Claims, 5 Drawing Figures

PATENTED JAN 7 1975  3,859,574

ELECTROLYTIC CAPACITOR WITH IMPROVED HEADER AND METHOD OF MAKING SAME

BACKGROUND OF THE INVENTION

This invention relates to an electrolytic capacitor and in particular, to a capacitor header that is supported by an open end section of a capacitor casing so as to provide a reliable and effective seal that is resistant to deterioration by and leakage of the electrolyte. The invention also relates to a novel method for closing off the open end section of the casing.

In the use of capacitors of the electrolytic type, it is desirable to prevent permeation of the electrolyte through the capacitor casing. A common problem experienced when corrosive electrolytes, such as DI-METHYL FORMAMIDE, hereinafter referred to as DMF, are used is the ultimate deterioration of the header which results in leakage of the electrolyte and eventual malfunction of the capacitor.

There have been several attempted prior art solutions to such a problem. One known capacitor header is entirely constructed from plastic material. However, this type header has not proved satisfactory in sealing the electrolyte due to a deterioration, softening and bending of the header at relatively high temperatures.

Another prior art capacitor header aimed at solving the aforementioned problems is entirely made of rubber. The use of the rubber header, however, has not been entirely satisfactory since it is difficult to consistently provide a tight seal about the terminal wire or terminal extending therethrough. In those instances in which the seal is not tight, high pressures generated within the capacitor will cause the electrolyte to leak. Additional sealant such as epoxy coating is required to delay leakage of the electrolyte.

Yet another prior art header assembly comprises a metallic plate having a plastic insulator centrally located therein, wherein the insulator surrounds and contacts a terminal which extends through the header. A rubber washer abuts the inward side of the metallic plate and acts as an insulator. The washer is placed in a compressed and distended state by an offset portion of the terminal. The capacitor electrode assembly is attached to the terminal. On the outside of the plate, engaging the periphery of the terminal, is a true-arc ring that prevents the terminal from moving downwardly. While such a header is significantly more reliable than many of the other headers used in the field, the assembly of such units is more difficult and tends to add to the overall manufacturing cost of the capacitor.

SUMMARY OF THE INVENTION

Accordingly, it is an object of the present invention to provide an improved capacitor header that prevents leakage of the electrolyte to the atmosphere by providing a reliable seal, and particularly which provides a reliable seal about the terminal or lead wire that extends through the header assembly.

Another object of the invention is to provide a method for manufacturing and assembling a capacitor header within an open end section of a capacitor casing so as to close off the capacitor in a manner which is more economical and to provide a capacitor which experiences fewer failures in use.

Another object of the invention is to provide a novel capacitor header wherein a single member provides two separate reliable seals that are simple and inexpensive in construction, whereby added reliability is obtained by reason of two separate sealing areas of increased dimension.

Another object of the invention is to provide a seal comprised of two discs supported in spaced relation, each having a swaged lead hole therethrough, and an oversized elastomeric member located in the intervening space with opposite ends thereof received within the lead holes, so that the elastomeric member when in a compressed and distended condition provides a more effective seal due to the greater surface area of the seal which contacts the surfaces of the discs about the lead holes, and also resulting in an increase in the length of the path which the electrolyte must travel in order to escape the housing portion.

In order to accomplish the aforementioned objects, there is provided a capacitor header construction that is assembled inwardly of the open end of an electrolytic capacitor casing which contains an electrolyte. Two generally flat discs are provided so as to be disposed with their outer edges in abutting contact with the interior surface of the capacitor casing, and are so arranged as to be in adjacent spaced relationship with respect to each other. At least one apertured protrusion is formed on at least one side of each disc to define swaged lead holes therethrough. The lead hole of one disc is axially aligned with respect to the lead hole in the other disc.

Opposite ends of a tapered generally cylindrical elastomeric sealing member having an outside diameter greater than that of the lead holes are inserted through the aligned holes. Terminals for the capacitor defined by lead wires extend through the elastomeric member. To effectuate a reliable fluid impervious seal so as to prevent electrolyte leakage, the elastomeric member is compressed between the two discs so that a large portion of the surface of the elastomeric member is in sealing contact with correspondingly extensive surfaces of the two discs surrounding the lead holes. This compressed arrangement provides incrased sealing contact of the elastomeric member with the discs, provides a longer tortuous path that further inhibits fluid leakage and provides a tighter seal with the terminal which is located within the elastomeric member. Of significance, is the fact that the elastomeric member has two opposite surfaces in compressed relation with the surfaces of the lead holes in two different discs whereby, two distinct seals are provided for the terminal members.

To close off the open end of the casing, the header is placed within the open end section of the casing. The open end section includes an annular shoulder within the casing upon which the header is supported, and which provides a reaction surface for the compressing of the elastomeric member. To compress the elastomeric member, the outward facing annular edge of the end section is rolled over so that it is bent inwardly to apply a downwardly directed force via a sealing member to the outward facing header disc, which is sufficient in magnitude to effectuate the desired compression.

These and other objects, features and advantages of the preferred embodiments of the present invention will become apparent when considered in conjunction with the accompanying drawings, wherein like reference numerals indicate like structure throughout the several figures:

DETAILED DESCRIPTION OF THE PREFERRED EMBODIMENTS

Figure 1:
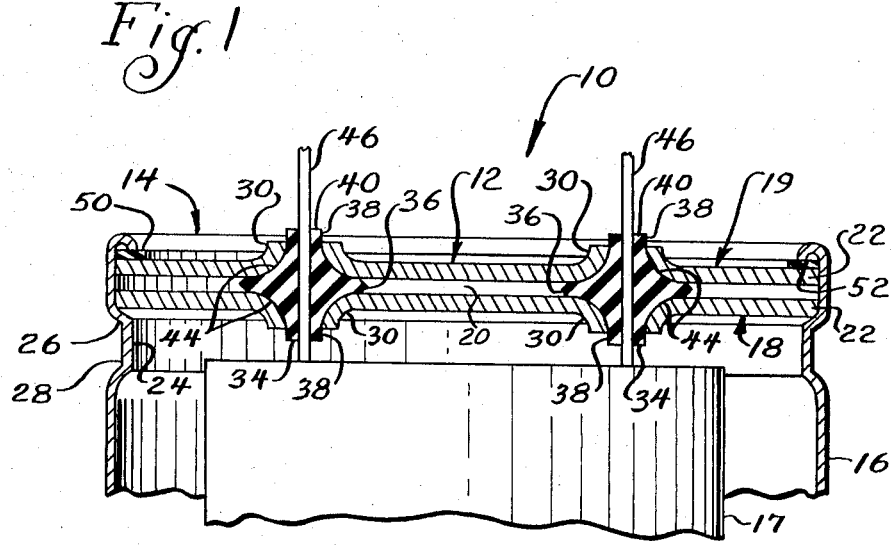
FIG. 1 is a side elevational view in section of a preferred embodiment of the capacitor header made in accordance with the principles of the invention.

Now referring to FIG. 1 of the drawings, there is disclosed an electrolytic capacitor, generally indicated by reference numeral 10, and a capacitor header construction made in accordance with the principles of the invention and designated by the reference numeral 12. The header construction 12 is disposed inwardly of the open end section 14 of a generally cylindrical capacitor casing 16 which serves to store the capacitor electrolyte and capacitor section 17.

The preferred header construction 12 is comprised of a pair of generally flat circular discs 18 and 19. When inserted inwardly of the open end, the two discs 18 and 19 are so arranged as to be in adjacent spaced relationship with respect to each other. A chamber 20 is defined by the space between the two discs 18 and 19. The discs 18 and 19 are dimensioned so that the outer edges 22 thereof are in frictional engagement with the interior surface 24 of the casing 16. Each of the discs 18 and 19 of the header 12 is made of a suitable material that is corrosive resistant to the electrolyte being used. If the electrolyte in use is a DMF electrolyte, the header discs 18 and 19 are manufactured from aluminum. The innermost oriented disc 18 is seated upon an annular shoulder 26 formed by annular groove 28 on the open-end section 16 of the casing. In this manner, the shoulder 26 provides a support and reaction surface for the header construction 12. In the preferred embodiment, the discs 18 and 19 are provided with apertured protrusions 30 extending from at least one side of the discs to define lead holes 32. The lead holes 32 on the outermost disc 19 are axially aligned with the lead holes 32 on the innermost disc 18. The resulting pairs of aligned holes 32 have elastomeric sealing members 34, preferably rubber, fitted and compressed therebetween.

Figure 3:
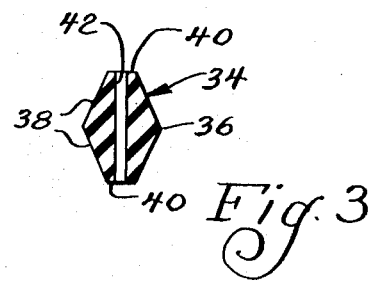
FIG. 3 is a side elevational view in section of the elastomeric seal element in the non-compressed condition shown in FIG. 1.
Figure 4:
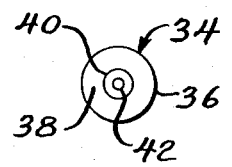
FIG. 4 is a plan view of the seal element shown in FIG. 3.

As more clearly depicted in FIGS. 3 and 4, in the non-compressed condition, each elastomeric member 34 has a generally cylindrical-shaped configuration which has a middle portion 36 defining the major outside diameter of the member at the minor axis and two converging tapered surfaces 38. Each of the surfaces 38 thereof converges from th middle portion 36 towards respective end surfaces 40 of the elastomeric member 34. Openings 42 extend longitudinally through and along the major axis of each of the elastomeric members 34. Both end surfaces 40 of the elastomeric members define the minimum diameter thereof and are so dimensioned as to permit insertion through the lead holes 32 and into snug engagement with surfaces 44 which surround each of the lead holes 32 for purposes that will be hereafter discussed. It should be stressed at this point that the maximum diameter of the members 34 at the middle portion 36 is substantially larger than the diameter of the lead holes 32. While elastomeric members with a generally cylindrical shape have been discussed, the scope of the present invention includes varying shaped sealing members, so long as a portion of their outside diameter is larger than the dimension of the openings for the lead holes 32.

Lead wires or terminals 46 are fitted and secured within the openings 42 so that one end of each wire or terminal extends beyond the openings 42 and defines a terminal for the capacitor 10 and the outwardly extending opposite end may be suitably secured to a conventional capacitor section 17.

A gasket 50 made of suitable material, such as rubber, is used to provide an additional seal for the capacitor header 12. The gasket is mounted on and is generally coincident with the outer circumference of the outermost disc 19. If, for instance, an aluminum electrolytic capacitor is constructed, the gasket material will correspond to one normally used with aluminum electrolytic capacitors.

As more clearly seen in FIG. 1, in the assembled condition of the header the elastomeric members 34 are in a compressed condition to effectuate an improved and more reliable seal. To distend and compress the elastomeric members 34 between the two discs 18 and 19 as shown, edge 52 on the open end section 14 is conventionally rolled over or bent inwardly in the conventional procedure used in the field so that edge 52 engages the gasket 50 and applies downwardly compressive forces to firmly compress and distend the elastomeric members 34 and gasket 50. Upon completion of the rollover of casing 16, the tapered surfaces 38 extend through lead holes 32 and effectively sealingly secure the surrounding surfaces 44 on discs 18 and 19 with which contact is made by the compressed members 34. Additionally, the arcuate configurations of surfaces 44, which is accomplished by the swaging operation, cooperate to radially compress the elastomeric members 34 securely about the periphery of lead wires 46 and also establish a series of relatively long tortuous paths over which the electrolyte must travel in order to leak to the atmosphere.

As previously stated, the assembling process of the present invention for closing off the open end section 14 of the casing 16 is easily and economically performed. In order to assemble the header 12 of the capacitor 10, capacitor section 17 is placed inwardly of open end section 14, in casing 16 the ends of lead wires 46 are already suitably secured to the capacitor section 17.

As aforenoted, open end section 14 has a shoulder 26 which supports and provides a reaction surface for header 12. Disc 18 is now inserted within casing 16 and is brought to rest on shoulder 26. The outward ends of lead wires 46 are next introduced into openings 40 of the elastomeric members 34 and members 34 are slid along wires 46 to bring the lower end surface 40 into engagement with the corresponding one of the lead holes 32 extending through disc 18. Thereafter, disc 19 which has its lead hole 32 axially aligned with the corresponding lead hole 32 in disc 18, is lowered over the outward ends of lead wires 46 to bring the lead holes 32 in disc 19 into engagement with upper surface 38 of elastomeric members 34. Gasket 50 is mounted on the outermost disc 19. Upon completion of the foregoing assembly steps, edge 52 is conventionally rolled over so as to engage gasket 50 and apply generally downward forces on header 12 of a sufficient magnitude to compress elastomeric members 34 between the two discs 18 and 19 and against the reaction force of shoulder 26 to thereby effectuate the fluid impervious seal as aforediscussed.

If DMF is to be used as an electrolyte, the discs 18 and 19 will preferably be composed of a metal such as aluminum which is corrosive resistant to DMF, or a plastic which is resistant to the deteriorating effects of DMF. the metal should have a thickness of approximately .032 thousands of an inch, which roughly corresponds to the thickness of casing 16. This approximate dimension will normally ensure that the discs 18 and 19 will not fail during the period of application of the compressive stresses which are applied to the header 12 during rollover and that any increases of pressure within the capacitor 10 will not cause the header to fail prior to the casing 16. In those instances in which metal is used, the sealing members 34 will additionally serve to insulate the lead wires 46 from the metallic discs.

Figure 1A:
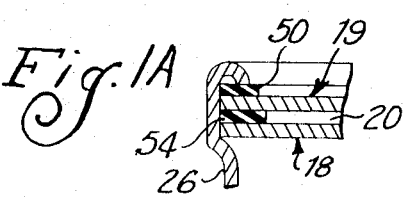
FIG. 1A is a fragmented sectional side elevational view showing an alternate embodiment of the present invention.
Figure 2:
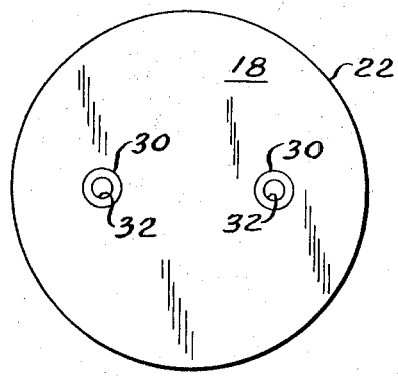
FIG. 2 is a plan view of a disc used in the header construction of the invention shown in FIG. 1.

Various modifications may be made to the novel capacitor header without departing from the spirit of the invention. Referring to FIG. 1A a complete double seal may be obtained, for example, by locating a gasket member 54 between the metal discs 18, 19. In yet another variation, the first gasket 50 may be located as shown in FIG. 1 and a second gasket may be located between the shoulder 26 and the lower face of the metal disc 18. It is of course apparent that in capacitor housings which have an opening at each end, the arrangement shown in FIG. 1 may be used to close both ends of the capacitor housing.

I claim:

1. An electrolytic capacitor having a casing with at least one open end section, a support surface adjacent the open end section, and a rolled over edge, a capacitor section within the casing, a header supported on said support surface and closing the open end section of the casing; said header including first and second end closing members, each of said closing members having at least one aperture formed therein forming at least one lead hole, said lead hole in said first closing member being axially aligned with said lead hole in said second closing member; and first sealing means including an elastomeric member being located and aligned within said lead holes of said first and second closing members, a lead wire extending through said elastomeric member and connected with the capacitor section, said rolled over edge being so arranged relative to said support surface that said first and second closing members are compressed by and between said edge and said shoulder thereby compressing and distending said elastomeric member and providing a first compression seal with said first closing member, a second compression seal with said second closing member and a third compression seal with said lead wire.

2. An electrolytic capacitor having a casing with at least one open end section, a support shoulder and an edge portion, a capacitor section within said casing, a header closing said open end section including first and second end closing members, each of said closing members having at least one aperture formed on at least one side thereof to define at least one lead hole therethrough having an arcuate surface, said lead hole in said first closing member being axially aligned with said lead hole in said second closing member, and first sealing means including an elastomeric member having a terminal extending therethrough operatively connected to said capacitor section, said elastomeric member being located and aligned within said lead holes of said first and second closing members, said shoulder providing a support and reaction surface for said first and second closing members, said edge portion being so arranged that said first and second closing members are compressed by and between said edge portion and said shoulder such that said arcuate surfaces of said lead holes effect compression and distension of said elastomeric member to thereby provide a first compression seal with said first closing member, a second compression seal with said second closing member, and a third compression seal extending along the extent of said terminal within said elastomeric member.

3. A capacitor as defined in claim 2, wherein at least a portion of said elastomeric member is of a diameter which is greater in dimension than the diameter of said lead holes.

4. A capacitor as defined in claim 3, wherein said portion is located at the approximate middle of said elastomeric member, and which includes tapered surfaces which converge from said portion to respective end surfaces of said elastomeric member, and wherein said end surfaces define a diameter of said elastomeric member which is received within the dimension of said lead holes.

5. A capacitor as defined in claim 2, which includes a second seal means having an outer periphery which is coincident with the interior configuration of said casing and which is mounted on the outer surface of said second closing member.

6. A capacitor as defined in claim 2, which includes a second seal means having an outer periphery which is coincident with the interior configuration of said casing and which is mounted between said first and second closing members.

7. A capacitor as defined in claim 2, wherein said first and second closing members are in frictional contact with the interior of said casing.

8. A capacitor as defined in claim 2, in which each of said lead holes has extended arcuate surfaces, the arcuate surfaces on said first and second end closing members projecting in opposite directions, and on which the surface of said elastomeric member conforms when subjected to compressive forces of said edge portion.

9. The capacitor as defined in claim 8 wherein said first and second closing members are made from a metallic material.

10. An electrolytic capacitor having a casing with at least one open end section, a support shoulder, and an edge portion, a capacitor section within said casing and a header closing said open end including first and second end closing members, each having at least one apertured protrusion formed on at least one side thereof to define a lead hole therethrough having arcuate surfaces, said lead hole in said first closing member being axially aligned with said lead hole in said second closing member, first sealing means including an elastomeric member having a lead wire extending therethrough which is operatively connected to said capacitor section and having a maximum diameter portion that is greater in dimension than the diameter of each of said lead holes, said elastomeric member being located and aligned within said lead holes of said first and second closing members, and second sealing means having an outer periphery generally coincident with the interior configuration of said casing and located in the area between said shoulder and said edge portion, said shoulder providing a support and reaction surface for said first and second closing members and said edge portion being so arranged that said first and second closing members are compressed by and between said edge portion and said shoulder such that said arcuate surfaces of said lead holes effect a compression and distension of said elastomeric member and said edge portion effects compression of said second seal means, said compressed elastomeric member providng a first compression seal with said first closing member, a second compression seal with said second closing member, and a third compression seal extending along the extent of said lead wire within said elastomeric member.

11. The capacitor as defined in claim 10, wherein said elastomeric member has surfaces that convergingly taper from said maximum diameter portion to respective ends of said elastomeric member which define the minimum diameter of said elastomeric member.

12. An electrolytic capacitor having a casing with an open end section with a shoulder and rolled over edge, a capacitor section in the casing, and a header having at least first and second closing members closing said open end section, said closing members being generally flat and having outer edges in abutting contact with the interior surface of said casing, said closing members being of a suitable material that is resistant to capacitor electrolyte; at least one apertured protrusion formed on at least one side of each of said closing members to define swaged lead holes therethrough, said lead holes being axially aligned with respect to each other with said protrusions extending in opposite directions; first sealing means including an elastomeric member having a terminal extending therethrough which is operatively connected to said capacitor section, said elastomeric member being inserted between said closing members and in alignment with said aligned lead holes of each of said closing members, second sealing means having an outer periphery coincident with the interior configuration of said casing and mounted on said second closing member, said first and second closing members being supported on said shoulder, said edge being pressed into contact with said second sealing means and thereby compressing and distending said elastomeric member so as to provide increased areas of sealing surfaces with said closing members and said terminal and to effect compression seals with said sealing surfaces of said closing members and said terminal.

13. The method of closing off an open end electrolytic capacitor having a casing with a shoulder, an edge portion and a capacitor section having operatively connected thereto a terminal lead by a header which includes at least first and second closing members, each of which has at least one apertured protrusion to define a lead hole for the terminal lead and an elastomeric member located between said first and second closing members comprising the steps of:

inserting a first closing member inwardly of the open end, with the terminal lead extending through said lead hole, until said first closing member abuts and is supported on said shoulder;

sliding said elastomeric member along said terminal lead until said terminal lead extends through said elastomeric member and until a portion of said elastomeric member is urged into said lead hole on said first closing member;

moving the second closing member inwardly of said open end until the upper portion of said elastomeric sealing member is urged into said lead hole in said second closing member;

mounting a seal member on said second closing member so that the outer periphery thereof coincides with the interior configuration of said casing; and applying generally inwardly directed compressive forces, by rolling over the edge portion, in order to effect a closing off of the open end and simultaneously effect a compression seal between said elastomeric member, said first and second closing members and said terminal lead by concomitantly distending and compressing said elastomeric member located between said first and second closing members.

* * * * *